(12) United States Patent
Catalano

(10) Patent No.: US 7,908,820 B2
(45) Date of Patent: Mar. 22, 2011

(54) SPACER BAR CONNECTOR

(75) Inventor: Vincent R. Catalano, St. Charles, IL (US)

(73) Assignee: Allmetal, Inc., Bensenville, IL (US)

(*) Notice: Subject to any disclaimer, the term of this patent is extended or adjusted under 35 U.S.C. 154(b) by 753 days.

(21) Appl. No.: 11/926,898

(22) Filed: Oct. 29, 2007

(65) Prior Publication Data

US 2009/0107085 A1    Apr. 30, 2009

(51) Int. Cl.
- E06B 3/00 (2006.01)
- E04C 2/38 (2006.01)
- E04C 2/54 (2006.01)
- E04C 2/34 (2006.01)

(52) U.S. Cl. .......... 52/786.13; 52/783.1; 52/784.11; 52/784.1; 52/784.16; 52/787.1; 52/795.1; 52/656.9; 52/204.5

(58) Field of Classification Search ......... 52/786.13, 52/782.24, 783.1, 783.18, 784.11, 784.1, 52/784.16, 787.1, 795.1, 656.1, 656.9, 204.5, 52/204.705, 204.71, 204.72, 656.2, 656.5; 403/300, 247, 252, 295, 298

See application file for complete search history.

(56) References Cited

U.S. PATENT DOCUMENTS

| | | | |
|---|---|---|---|
| 5,099,626 A | 3/1992 | Seeger | |
| 5,177,920 A * | 1/1993 | Rafeld | 52/314 |
| 5,209,599 A * | 5/1993 | Kronenberg | 403/298 |
| 5,560,731 A * | 10/1996 | Kronenberg | 403/298 |
| 5,694,730 A * | 12/1997 | Del Rincon et al. | 52/586.1 |
| 6,244,012 B1 * | 6/2001 | McGlinchy et al. | 52/665 |
| 6,347,902 B1 * | 2/2002 | Loh | 403/298 |
| 6,431,784 B1 * | 8/2002 | Kronenberg | 403/297 |
| 6,675,545 B2 * | 1/2004 | Chen et al. | 52/586.1 |
| 6,709,187 B2 * | 3/2004 | Loh | 403/298 |
| 6,862,859 B2 * | 3/2005 | Kronenberg | 52/656.9 |
| 6,883,278 B2 * | 4/2005 | McGlinchy et al. | 52/204.61 |
| 7,070,356 B2 * | 7/2006 | Kronenberg et al. | 403/297 |
| 7,076,927 B2 * | 7/2006 | Trpkovski | 52/204.5 |
| 7,107,729 B2 * | 9/2006 | Baratuci et al. | 52/204.593 |
| 7,124,546 B2 * | 10/2006 | Scharff et al. | 52/314 |
| 7,628,562 B2 * | 12/2009 | Annes | 403/329 |
| 7,757,455 B2 * | 7/2010 | Gallagher | 52/656.5 |
| 2007/0022700 A1 * | 2/2007 | Gallagher | 52/656.9 |

* cited by examiner

*Primary Examiner* — Richard E Chilcot, Jr.
*Assistant Examiner* — Mark R Wendell
(74) *Attorney, Agent, or Firm* — Banner & Witcoff, Ltd

(57) ABSTRACT

An integrally molded window spacer bar connector for joining opposed spacer bar end passages in the form of a hollow tube with a longitudinal axis of symmetry and a transverse axis of symmetry includes inclined leading edge ramps, a medial rib to control the insertion of the connector into spacer bars, and external channels to receive a sealant material for sealing the connector to the spacer bar at the seam of the joint of the spacer bar.

20 Claims, 2 Drawing Sheets

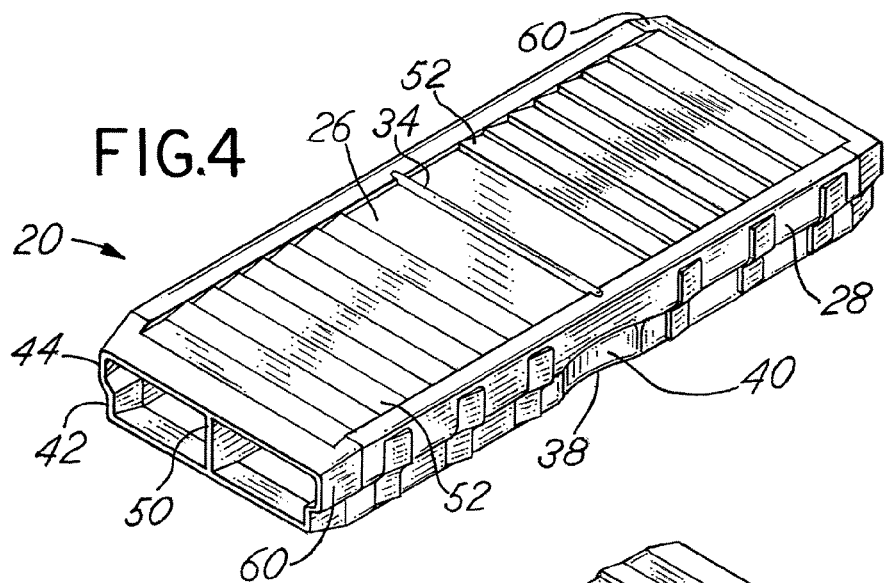
FIG.4
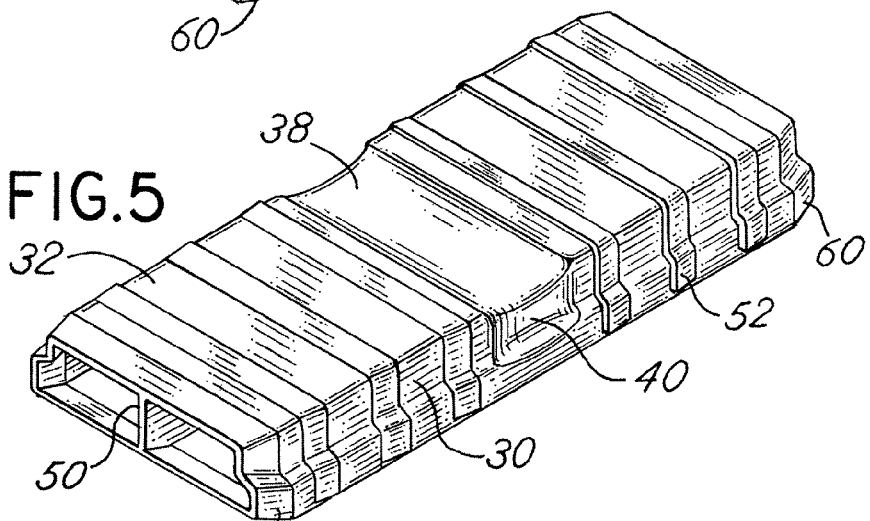
FIG.5
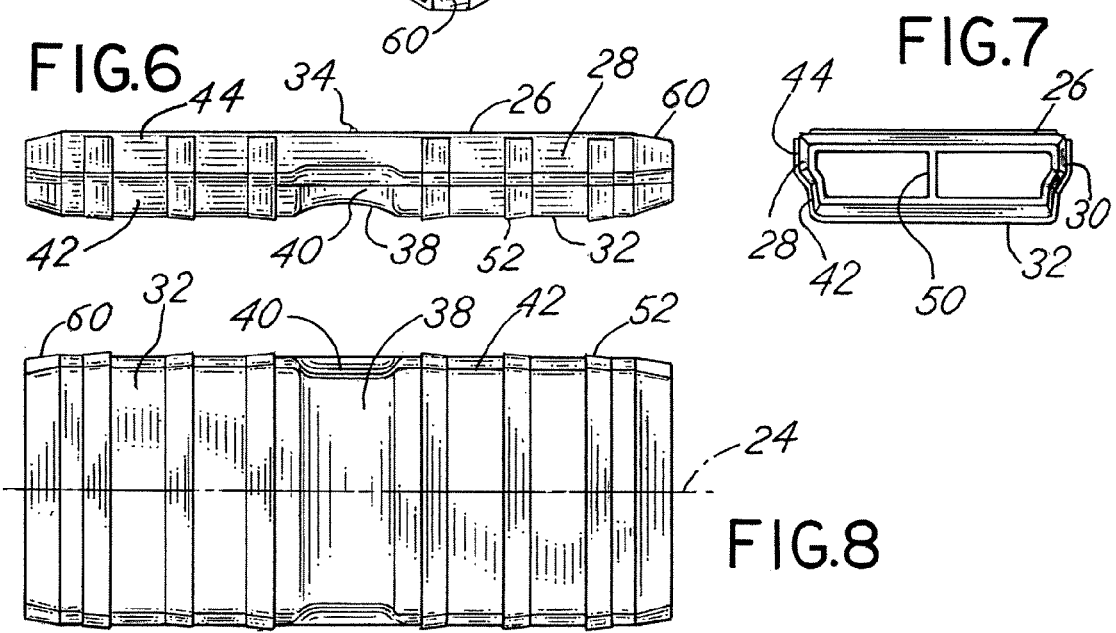
FIG.6
FIG.7
FIG.8

SPACER BAR CONNECTOR

BACKGROUND OF THE INVENTION

In a principal aspect the present invention relates to a molded plastic connector which is used to join the open end passages of a spacer bar for a double glazed window.

Modern buildings typically utilize a double glazed window construction having first and second panes of glass separated by a peripheral spacer bar to define a volume or region between the spaced panes. The atmosphere within that volume or region is generally an inert gas and the volume or region is sealed to preclude condensation of moisture. Typically, the spacer bar is an aluminum alloy or stainless steel alloy in the form of a hollow tube having a generally rectangular configuration. Such spacer bars are formed typically by configuring a planar sheet of metal into the desired tubular form. The hollow tube is then bent in the form of a frame configured to coincide with the periphery of the spaced window panes. The opposite ends of the spacer tube are joined one to the other by some means to maintain the integrity of the peripheral frame. Often a desiccant material is placed within the hollow spacer bar to further control and prevent the collection of moisture within the region between the spaced window panes.

An objective associated with the manufacture of double glazed window panes is enhancement of production capacity and production speed. Thus, any construction or means which will increase the efficiency of the manufacturing operation of double glazed windows is an extremely desirable objective. An additional objective is to provide a means for connecting the hollow end passages of a spacer bar to maintain the structural integrity of the spacer bar frame and the integrity of the connection between the ends of the spacer bar.

SUMMARY OF THE INVENTION

Briefly, the present invention comprises a spacer bar connector which is designed to join a first and a second end opening and passage of a spacer bar. The spacer bar connector is made from a molded material, such as glass filled nylon, and has a generally uniform cross sectional configuration in the form of a hollow tube having a longitudinal axis with a medial, transverse outside rib that defines a boundary between the joined spacer bar ends. That is, the hollow tube is generally a symmetrical configuration which has one end thereof insertable into the end passage of a first spacer bar and the opposite end insertable into the end passage of an opposed spacer bar. The connector thus includes a transverse external configuration which is substantially congruent with the internal configuration of the spacer bars joined by the connector. This is typically a rectangular cross sectional configuration and includes a top wall with the medial rib projecting therefrom, first and second spaced lateral side walls and a bottom side wall. The spacer bar thus includes a longitudinal axis which defines a plane of symmetry. The spacer bar further is also symmetrical about the transverse plane through the medial rib. The spacer bar is hollow and may include one or more reinforcing longitudinal walls within the hollow interior. The external surfaces of the walls may include a pattern of raised projections which facilitate gripping of the connector with the internal passages of the spacer bars which are joined together by the connector. The bottom wall of the connector includes a transverse channel generally aligned with the medial rib. The transverse channel extends at least partially upwardly along the lateral side walls of the connector. The channel is designed to receive a sealant material such as a butyl sealant to insure a sealed joint between the connector and the joined spacer bars. Further lateral longitudinal side channels are defined in the lower margin of the lateral side walls of the connector. Additionally, the opposite ends of the connector include inclined ramps which facilitate the insertion of the connector into the open ends or passages at the ends of the spacer bars which are joined together by the connector.

The connector is fabricated as a molded plastic element and has a high degree of structural integrity. A typical material for the manufacture of such a connector is a glass filled nylon material such as a 15% or 30% glass filled nylon material.

Thus, it is an object of the invention to provide an improved spacer bar connector having a high degree of structural integrity and which will facilitate the ease of manufacture of spacer bars in combination with spaced, double glazed window panes.

Another object of the invention is to provide a spacer bar construction including a connector which enables the placement of sealant between the connector and the connected spacer bars.

A further object of the invention is to provide a connector construction which enables the insertion of appropriate desiccant material into the hollow passages of the connector as well as the hollow passages of the associated connected spacer bars. The desiccant may be introduced through the connector and may easily flow through the hollow connector and hollow spacer bars joined by the connector.

Another object of the invention is to provide an inexpensive, yet highly effective connector for joining spacer bars wherein the connector may be fabricated with a desired cross sectional configuration compatible with the spacer bars that are to be joined together.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 4 is an isometric view of a connector as utilized in the combination of FIGS. 1-3;

FIG. 5 is an isometric view of the connector of FIG. 4 as viewed from the under or bottom side thereof;

FIG. 6 is a top side plan view of the connector of FIG. 4;

FIG. 7 is a bottom side plan view of the connector of FIG. 4; and

FIG. 8 is an end view of the connector of FIG. 4.

DESCRIPTION OF AN EMBODIMENT OF THE INVENTION

Figure 1:
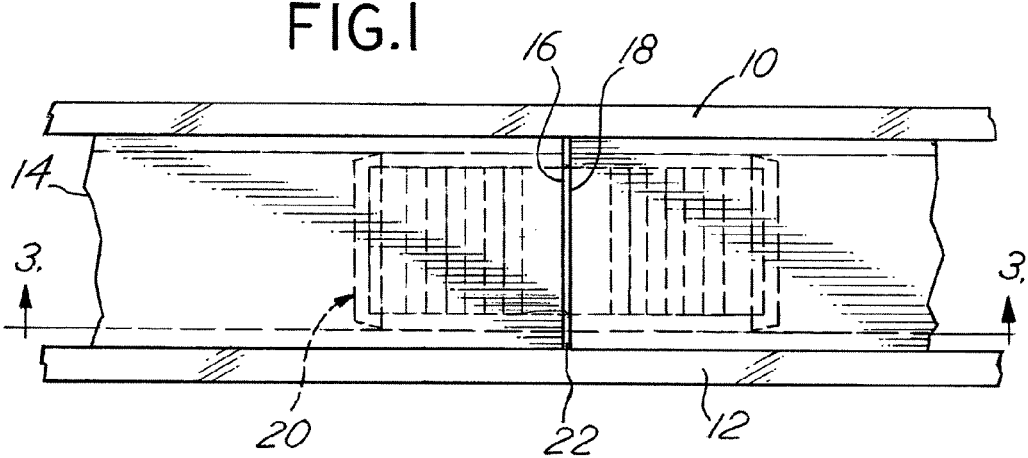
FIG. 1 is a top plan view of the combination of first and second spaced window panes spaced one from the other by a spacer bar construction in the form of a closed loop or frame wherein the opposite ends of the spacer bar are joined together by a connector.
Figure 2:
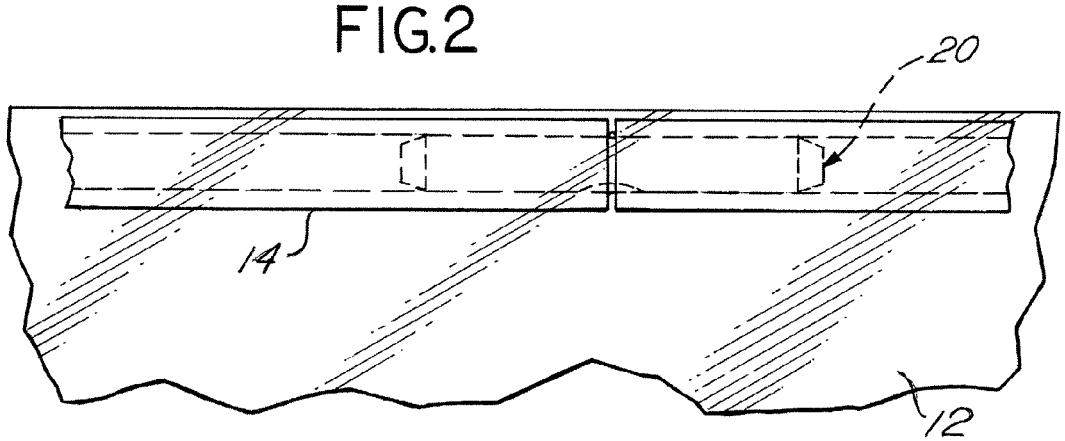
FIG. 2 is a side view of the combination of FIG. 1.
Figure 3:
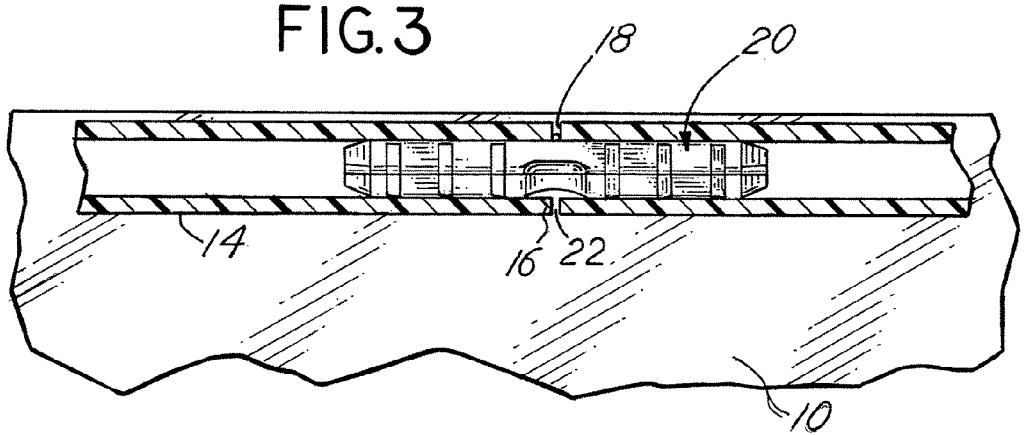
FIG. 3 is a partial cross sectional view of the side view of FIG. 2.

In the following description, an embodiment of the connector of the invention is depicted in its intended environment in FIGS. 1-3. The connector itself is depicted in FIGS. 4-8. The connector itself is exemplary and the features of the connector may be incorporated in connectors compatible with spacer bars having various internal passage configurations. That is, referring to FIGS. 1-3, a typical double glazed window will include a first pane 10 and a second pane 12. Panes 10, 12 are separated from one another by a spacer bar 14 to thereby define a space or gas filled region between the panes 10 and 12. The region between the panes 10 and 12 is typically a region which is sealed from the external atmosphere and which typically will include a gas, such as argon or the like. The atmosphere therefore between the panes of glass 10 and 12 is a controlled atmosphere and the spacer bar 14 provides a means for sealing the region between the panes of glass in order to maintain the controlled atmosphere.

Typically, the spacer bar 14 is comprised of an elongate hollow tube having a rectangular cross section. The tube or bar 14 formed to be congruent with the peripheral pattern of the double glazed window with which it is associated. First and second ends 16 and 18 of the hollow spacer tube 14 are joined together by a connector 20. The connector 20 is comprised of a molded plastic material and is fitted into the first and second end passages of the spacer bar 14. The connector 20 is maintained in cooperation with the spacer bar 14 by means of frictional engagement therewith. The connector 20 further typically includes a sealant at the joint 22 between the spacer bar ends 16 and 18 on the external side of the connector 20 to facilitate the maintenance of the seal between the spacer bar 14 and the panes 10 and 12. Additionally, a desiccant material is inserted within the hollow tube of the spacer bar 14 and also within the hollow connector 20 to facilitate the maintenance of a generally moisture free environment between the panes 10 and 12.

The spacer bar of the invention thus comprises, as depicted in FIGS. 4-8, a hollow tube having a longitudinal axis 24. The hollow tube includes a top side wall 26, a first lateral side wall 28, a second lateral side wall 30 and a bottom side wall 32. The side walls 26, 28, 30 and 32 generally form a hollow tube in the form of a rectangle as viewed in transverse section. The axis 24 in the embodiment depicted defines a vertical plane which is a plane of symmetry wherein the construction of the connector 20 on the opposite sides of that plane is symmetrical. Transverse to the axis 24 is a medial rib 34 projecting outwardly from the top side wall 26. The medial rib defines the limit of insertion of the connector 20 into the end passages 16 and 18 of the spacer bar 14 as depicted, for example, in FIG. 1.

Aligned with the medial rib 34 and defined in the bottom side wall 32 is an outside channel 38 which extends transversely between the side walls 28 and 30 and partially upwardly as a side wall channel 40. Further, the lateral side walls 28 include a lower margin 42 which has a lesser lateral dimension than the upper margin of the side walls 44 thereby defining longitudinal side channels 42 connected with the channels 38 and 40. The channels 38, 40 and 42 provide a passage into which a sealant material may be inserted in the manufacturing process of a double glazed window using the connector 20 of the invention. The sealant insures and protects the internal integrity of the region between the panes 10 and 12 and is inserted once the connector 20 is engaged with the spacer bar 14.

The lateral spacing of the side walls 28 and 30 may be adjusted to accommodate the particular configuration of the spacer bar and as an optional feature if the lateral spacing is significant, then a longitudinal center wall 50 may be molded into the connector 20 to enhance the structural integrity thereof to insure that the connector 20 will not deform in an undesirable fashion. The longitudinal central wall 50 extends the length of the connector 20. Thus, the length of the connector 20, as well as its width and height, may be customized to conform with the internal end passages of the spacer bar 14.

As another important feature of the invention a series of ribs or projections 52 defining a pattern on the lateral sidewalls, top wall and bottom wall is desirably provided. The projections 52 have a lesser height than, for example, the transverse medial rib 34. The projections 52 are typically transverse ribs which enhance the gripping action of the connector 20 to the internal lateral top and bottom side walls of the spacer bar 14.

As another important feature of the invention, a series of inclined ramps 60 are provided at the opposite ends of the connector 20, i.e, at the leading edge of the lateral side walls to enhance insertion of the connector 20 into the open end passages of the spacer bar 14. The ramps 60 are thus inclined inwardly toward the longitudinal axis 24 as the ramp 60 approaches the extreme ends of the connector 20.

The projections or ribs 52 are generally, uniformly spaced one from the other along the top and bottom and lateral side walls of the connector. The ribs 52 are typically aligned with each other about the outside periphery of the connector though it is possible to offset the ribs 52 on the various walls with respect to each other in order to enhance the gripping action. Typically, the ribs or projections 52 are uniformly spaced from one another. That is, the ribs are uniformly spaced along the longitudinal axis of 24.

It is possible to vary the construction of the connector 20 in order to conform it with the size and configuration of the spacer bar 14. Various internal walls may be provided for the connector. The configuration and inclination of the described ramp 60 may be varied. The array and arrangement of the rib projections 52 may be varied. Thus, the invention is to be limited only by the following claims and equivalents thereof.

What is claimed is:

1. An integrally molded window spacer bar connector for joining first and second, opposed spacer bar end passages comprising, in combination:
    a generally uniform cross section tube enclosure having a longitudinal axis, a generally uniform cross sectional area, generally opposite parallel, generally flat planar first and second spaced lateral side walls, joined by a generally planar top side wall and a spaced generally planar bottom side wall, said walls forming a generally enclosed, axial throughbore,
    a transverse separation rib on the outside of the top side wall located intermediate the opposite ends of the tube,
    a leading edge inclined ramp at the opposite ends of the tube located in a side wall,
    a pattern of raised projections on the exterior surface of walls of the tube, and on opposite sides of the separation rib; and
    an outside channel formed in the bottom side wall intermediate the spaced side walls and extending at least partially from the bottom side wall along the spaced lateral side walls, said channel generally aligned with the transverse separation rib.

2. The combination of claim 1 wherein the transverse rib is a medial rib midway between the opposite ends of the tube.

3. The combination of claim 1 wherein each lateral side wall includes a ramp at each end inclined inwardly toward the longitudinal axis at each end of the tube.

4. The combination of claim 1 wherein the raised projections comprise a pattern of generally parallel ribs of lesser height than the transverse separation rib.

5. The combination of claim 4 wherein the raised projections are symmetrically formed on opposite sides of the rib.

6. The combination of claim 1 further including a longitudinal support wall within the tube connecting the bottom side wall and top side wall.

7. The combination of claim 1 molded from a glass filled nylon material.

8. The combination of claim 6 wherein the support wall is generally parallel to the first and second side walls.

9. The combination of claim 1 wherein the side walls are generally flat planar walls.

10. The combination of claim 1 wherein at least one of the side walls comprise a lower margin having a lesser exterior dimension to thereby form a side wall channel connected to the outside channel in the bottom side wall.

11. The combination of claim 1 in combination with first and second opposed spacer bar passages and fitted in said passages to form a spacer bar connection.

12. The combination of claim 11 further including first and second panes of glass positioned respectively, on opposite sides of the spacer bar adjacent the connection and further including a sealant in the channels for sealing the connector to the space bar at said connection.

13. The combination of claim 1 further including a desiccant material in the tube.

14. The combination of claim 12 including a desiccant material in the tube.

15. The combination of claim 1 wherein the connector is symmetrical on opposite sides of the intermediate separation rib.

16. The combination of claim 4 wherein the connector is symmetrical on opposite sides of the intermediate connection rib.

17. The combination of claim 10 wherein the connector is symmetrical on opposite sides of the intermediate connection rib.

18. An integrally molded window spacer bar connector for joining first and second, opposed spacer bar end passages comprising, in combination:
- a generally uniform cross section tube having a longitudinal axis, a generally uniform cross sectional area, axial throughbore; generally opposite parallel, generally flat planar first and second spaced lateral side walls; a generally planar top side wall and a bottom side wall,
- a transverse separation rib in the top side wall located midway the opposite ends of the tube;
- a leading edge inclined ramp at the opposite ends of the tube located in a side wall inclined inwardly toward the longitudinal axis;
- a pattern of raised projections on the exterior surface of walls of the tube, on opposite sides of the separation rib comprising a pattern of generally parallel ribs of lesser height than the transverse rib and generally parallel to the transverse rib; and
- an outside channel formed in the bottom side wall intermediate the spaced side walls and extending at least partially from the bottom side wall along the spaced lateral side walls, said channel generally aligned with the transverse separation rib, at least one of the side walls comprising a lower margin having a lesser exterior dimension to thereby form a side wall channel connected to the outside channel in the bottom side wall.

19. The combination of claim 18 wherein the connector is symmetrical about a plane through the longitudinal axis.

20. An integrally molded window spacer bar connector for joining first and second, opposed spacer bar end passages comprising, in combination:
- a generally uniform cross section tube enclosure having a longitudinal axis, a generally uniform cross sectional area, generally opposite parallel, generally flat planar first and second spaced lateral side walls, joined by a generally planar top side wall and a spaced generally planar bottom side wall, said walls forming a generally enclosed, axial throughbore,
- a transverse separation rib on the outside of the top side wall located intermediate the opposite ends of the tube,
- a leading edge inclined ramp at the opposite ends of the tube located in a wall, and
- an outside channel formed in the bottom side wall intermediate the spaced side walls and extending at least partially from the bottom side wall along at least one of the spaced lateral side walls, said channel generally aligned with the transverse separation rib.

\* \* \* \* \*